Nov. 7, 1961 J. P. BLANCHENOT 3,008,116
MOISTURE-PROOF QUICK-DISCONNECT DEVICE
Filed April 27, 1959 3 Sheets-Sheet 1
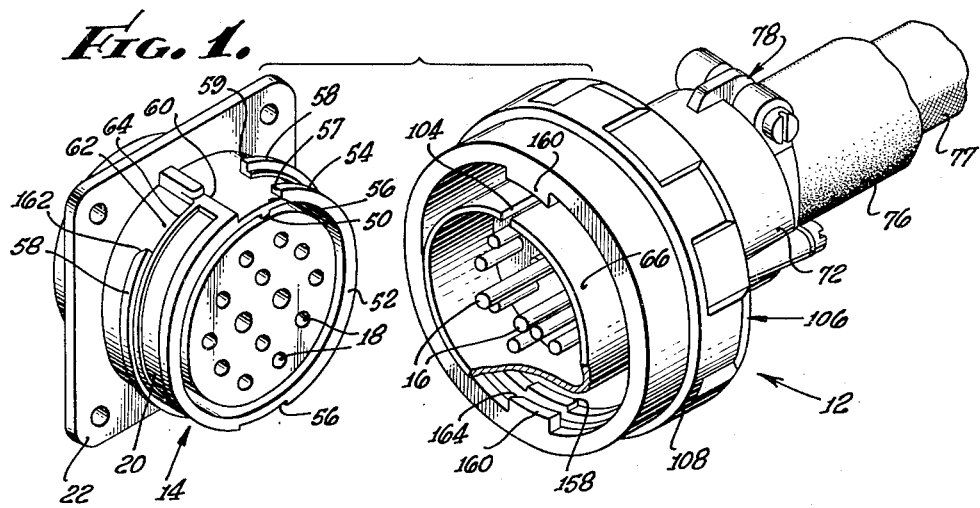
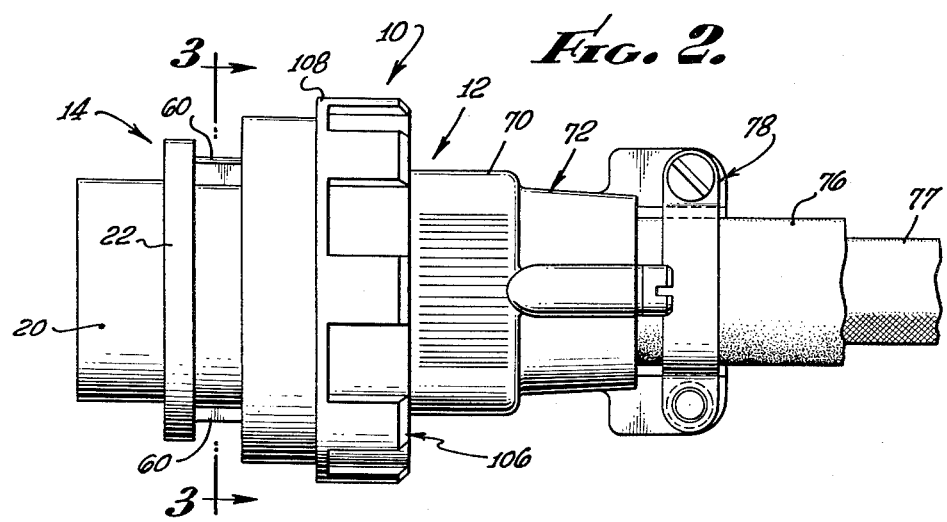
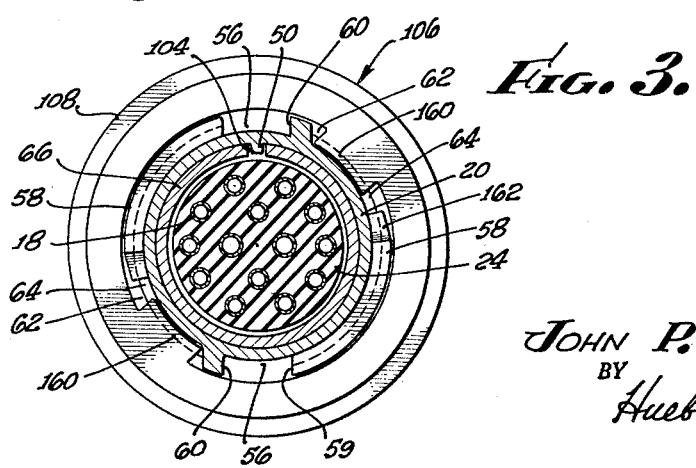
INVENTOR.
JOHN P. BLANCHENOT
BY
Huebner & Worrel
ATTORNEYS.

Nov. 7, 1961  J. P. BLANCHENOT  3,008,116
MOISTURE-PROOF QUICK-DISCONNECT DEVICE
Filed April 27, 1959  3 Sheets-Sheet 2

INVENTOR.
JOHN P. BLANCHENOT
BY
Huebner & Worrel
ATTORNEYS.

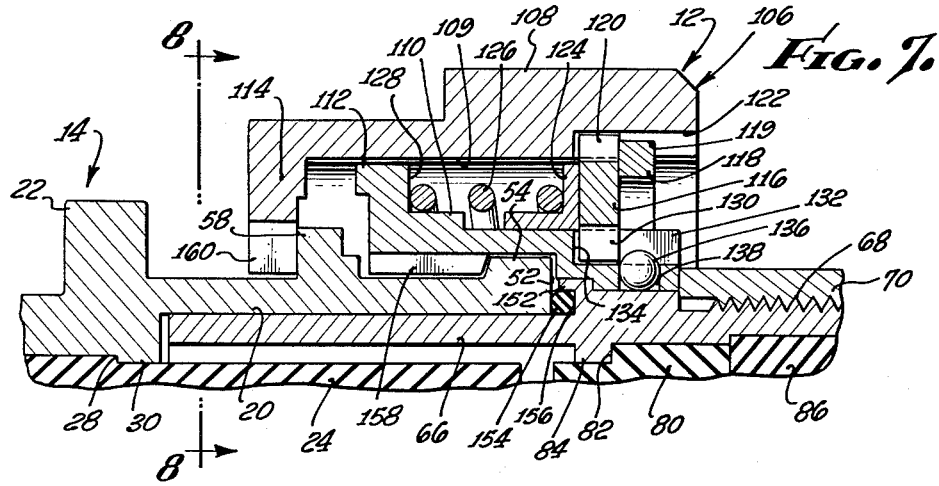
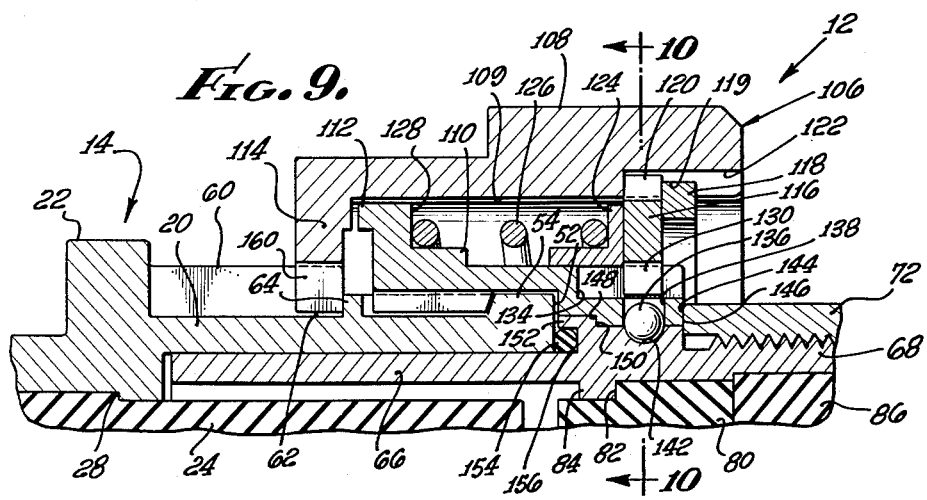
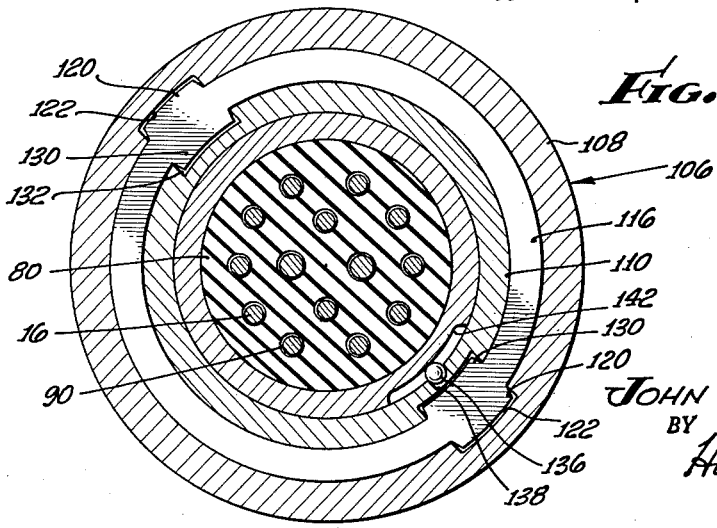

United States Patent Office 3,008,116
Patented Nov. 7, 1961

3,008,116
MOISTURE-PROOF QUICK-DISCONNECT
DEVICE
John Phillip Blanchenot, Agincourt, Ontario, Canada, assignor to Cannon Electric Company, Los Angeles, Calif., a corporation of California
Filed Apr. 27, 1959, Ser. No. 798,784
7 Claims. (Cl. 339—90)

This invention relates to a coupling for releasably securing a pair of engaging members, and it relates more particularly to a coupling for releasably securing the male and female members of a multi-contact electrical connector.

It is an object of the present invention to provide an improved coupling mechanism for quickly coupling and uncoupling a pair of engaging members.

Another object of the present invention is to provide novel coupling means for quickly operatively engaging and disengaging the male and female members of a multi-contact electrical connector.

Another object is to provide coupling means for quickly providing a moisture-proof operative connection between male and female engaging members, and means for quickly disengaging this operative connection.

It is another object of this invention to provide means for operatively engaging a male plug member within a female receptacle member, which includes a coupling ring assembly externally rotatably mounted on one of the members, the ring assembly having one portion which engages an external coupling thread on the other member, another portion of the ring comprising a locking device for holding a first portion of the ring in the coupled position.

Another object of this invention is to provide coupling ring means for operatively engaging and disengaging a male plug member in a female receptacle member, with a novel aligning detent provided for correctly initially aligning the coupling ring with the conventional polarizing means provided on the engaging members.

A further object of this invention is to provide coupling ring means for quickly operatively engaging and disengaging the male and female members of an electrical connector, the coupling ring means being operable to engage the connector members by merely moving the members together, moving an outer portion of the coupling ring further in the direction of engagement of the members against a biasing spring, and then rotating the coupling ring a fraction of a turn relative to the engaged members to a locked position.

It is also an object of the present invention to provide a coupling device of the character described which is simple and sturdy in construction, containing a minimum number of movable parts, and which is positive in operation.

Further objects and advantages of this invention will appear during the course of the following part of this specification wherein the details of construction and mode of operation of a preferred embodiment are described with reference to the accompanying drawings, in which:

FIGURE 1 is an exploded perspective view illustrating separated male and female members of an electrical connector embodying the present invention.

FIGURE 2 is a side elevation view of the connector members shown in FIGURE 1, operatively coupled.

FIGURE 3 is a cross-section along the lines 3—3 of FIGURE 2 showing the locking portions of the male and female members in their final locked positions.

FIGURE 7 is a fragmentary axial section similar to a portion of FIGURE 4, showing the relations of the parts in the intermediate position of the coupling ring as it is being moved between its initial position and its final, locked position.

FIGURE 9 is a fragmentary axial section similar to FIGURE 7, but with the coupling ring in its final, locked position.

FIGURE 10 is a cross-section taken on the line 10—10 of FIGURE 9, illustrating the relations of the parts with the coupling ring in its locked position.

Figure 4:
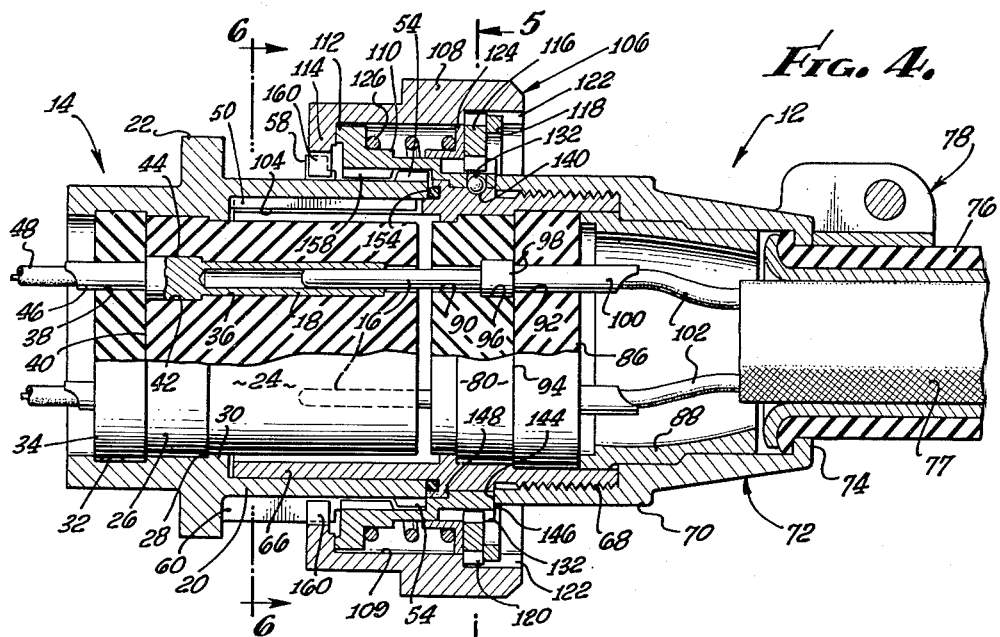
FIGURE 4 is an enlarged axial section showing the male and female connector members in the position in which they are first joined, but before movement of the coupling ring toward the locked position.

Referring to the drawings, the present invention is shown and described in detail herein in connection with an electrical connector 10 for a plurality of electrical circuits. However, it is to be understood that this invention is equally adaptable for releasably securing a pair of engaging members for other purposes, if desired.

The connector 10 includes a male plug member 12 and a female receptacle member 14. A plurality of pin contact members 16 are carried in the male plug member 12, and a plurality of complementary socket contact members 18 are carried in the female receptacle member 14. It is to be understood, however, that the pin contact members may alternatively be disposed in the receptacle member 14 and the socket contact members may be carried by the male plug member.

Referring now particularly to the female receptacle member 14, this member includes a tubular shell 20 preferably having a circular cross-section. A suitable mounting flange 22 is disposed on the outside of shell 20. A front insulation block 24 is disposed within shell 20, the block 24 having an enlarged base portion 26 which seats against the rearwardly facing shoulder 28 of an inwardly directed flange 30 forming a part of shell 20.

An annular groove 32 within shell 20 to the rear of front insulation block 24 receives a rear insulation block or grommet 34, which holds the front insulation block 24 in its operative position.

Aligned bores 36 and 38 are provided in the front and rear insulation blocks 24 and 34, respectively, for mounting the socket contact members 18. The rear face 40 of the front insulation block 24 is provided with counterbores 42 which receive complementary enlargements 44 on the socket contact members 18.

The rear ends 46 of the socket contact members 18 are recessed to receive conductor wires 48, which are soldered or crimped into place.

An axially directed, internal key 50 is provided in the forward portion of tubular shell 20 for aligning the plug and receptacle members of the connector in the usual manner.

A flat, annular front sealing surface 52 is provided on the tubular shell, and a pair of rudimentary thread elements 54 are disposed on the outer surface of shell 20 adjacent to this front sealing surface. A pair of diametrically opposed, axial keyway slots 56 are provided adjacent to the leading ends 57 of the thread elements 54, the slots 56 extended substantially rearwardly of the thread elements 54.

A pair of diametrically opposed, arcuate peripheral barriers 58 are provided on the outer surface of shell 20 to the rear of thread elements 54, the leading ends 59 of barriers 58 being adjacent to slots 56.

Axial guide shoulders 60 define the sides of the respective slots 56 opposite the leading ends 57 and 59 of thread elements 54 and barriers 58, respectively.

Notches or recesses 62 are provided in the trailing portions of peripheral barriers 58, small projecting arcuate webs 64 remaining just forward of notches 62.

The male plug member 12 includes a tubular barrel 66 having an externally threaded rear portion 68 adapted to threadedly engage the internally threaded forward portion 70 of endbell 72. The rear end of endbell 72 is provided with an inwardly directed flange 74, which engages cable bushing 76 within which the forward end of cable 77 is held. A suitable clamp 78 attached to endbell 72 locks cable bushing 76 and cable 77 in position.

A front insulation block 80 is disposed within the tubular barrel 66, insulation block 80 having a forwardly directing shoulder 82 which engages an inwardly directed flange 84 on the inside of tubular barrel 66.

Rear insulation block or grommet 86 abuts against the rear face of front insulation block 80, the rear insulation block 86 being held in its operative position from the rear by annular grommet follower 88 which seats within endbell 72.

Aligned bores 90 and 92 are provided in the respective front and rear insulation blocks 80 and 86 for mounting the pin contact members 16. The rear face 94 of front insulation block 80 is provided with counterbores 96 to receive enlargements 98 on the pin contact members 16. The rear ends 100 of pin contact members 16 are recessed to receive the forward ends of conductor wires 102, the wires 102 being soldered or crimped into position.

Plug barrel 66 is provided with an axial keyway 104 that is adapted to receive the axial key 50 on the inside of the female receptacle shell 20 for polarizing the plug member 12 and receptacle member 14.

A coupling ring assembly 106 is mounted on the outside of tubular plug barrel 66, the coupling ring 106 including an outer case 108 having a cylindrical bore 109 therein, and an inner case 110 disposed within the outer case 108. The inner case 110 is provided with an outwardly directed annular flange 112 at its forward end, this flange 112 operatively engaging an inwardly directed flange 114 disposed on the front end of outer case 108, to limit the rearward travel of outer case 108 over inner case 110.

A retainer ring 116 is disposed within the bore 109 of outer case 108, and is held in its operative position by a snap ring 118 which is engaged in an annular groove 119 in bore 109 near the rear of outer case 108. Retainer ring 116 is provided with outer positioning lugs 120 which are engaged in respective axial positioning slots 122 in the bore 109, whereby the retainer ring 116 is held against rotation relative to the outer case 108.

A spring retainer ring 124 seats against the front face of retainer ring 116 and receives one end of a helical compression spring 126, the other end of which abuts against a rearwardly facing shoulder 128 on the flange 112 of inner case 110. Thus, the spring 126 will normally urge the outer case 108 toward its rearwardmost position relative to inner case 110, as best illustrated in FIGURE 4. The outer case 108 is axially movable in a forward direction over the inner case 110 against the compression of spring 126, from its initial, rearwardmost position of FIGURE 4, to its forwardmost position as shown in FIGURE 7.

The retainer ring 116 is provided with inwardly directed lugs 130 which are received within outwardly facing axial slots 132 in the rear portion of inner ring 110, to prevent relative rotation between the inner and outer cases 110 and 108, respectively, while at the same time permitting the axial sliding movement of outer case 108 over inner case 110 heretofore described.

The forward limit of this axial sliding movement of outer case 108 over inner case 110 is determined by engagement of the lugs 130 with rearwardly directed shoulders 134 at the forward ends of slots 132.

Figure 5:
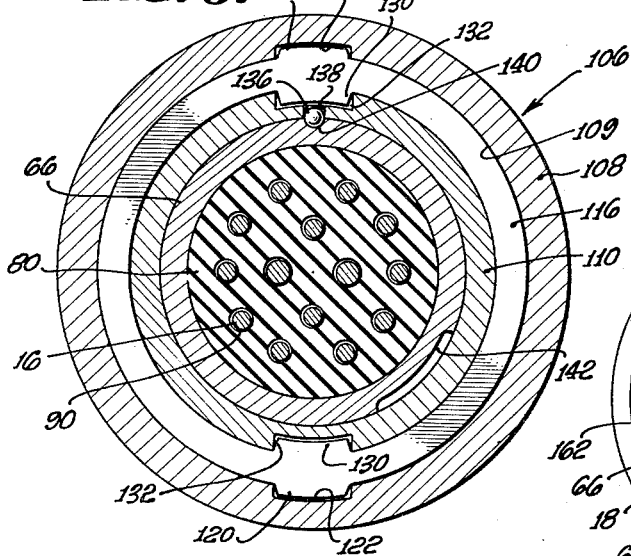
FIGURE 5 is a cross-section on the line 5—5 in FIGURE 4, with the parts in the same relative positions as in FIGURE 4, particularly illustrating the preferred aligning detent construction.

A ball detent 136 is radially movably mounted within a suitable radial aperture 138 through inner case 110 near its rear end. The coupling ring 106 is initially aligned in a fixed angular position relative to the plug barrel 66 so that when the axial key 50 of the receptacle member 14 is engaged in the keyway 104 of plug barrel 66, the coupling ring 106 will be correctly aligned with the female receptacle member 14. This fixed positioning of coupling ring 106 on plug barrel 66 is accomplished by engagement of the detent 136 in a recess 140 in the outer wall of plug barrel 66. In this initial position of coupling ring 106 on plug barrel 66, as shown in FIGURES 4 and 5, the detent 136 is locked in position in recess 140 by lug 130 on retainer ring 116, the lug 130 being disposed in covering position over the outer end of radial aperture 138.

In order to rotate the coupling ring 106, including both the outer case 108 and the inner case 110, about the plug barrel 66, it is necessary to move the outer case 108 forward over inner case 110 against the force of spring 126 until lug 130 moves forward out of the way of detent 136. The detent 136 is then free to move radially outwardly in aperture 138 out of engagement with recess 140, whereby coupling ring 106 may be rotated about plug barrel 66. A groove 142, best shown in FIGURE 5, is provided in the outer surface of plug barrel 66 in axially aligned, peripherally spaced relation to the recess 140, this groove 142 being adapted to receive the ball detent 136 when the coupling ring 106 has been rotated clockwise about the plug barrel 66 from the initial position as illustrated in FIGURES 4 and 5 to the final, locking position as shown in FIGURES 9 and 10. This permits the spring 126 to move the outer case 108 rearwardly again in this final, locking position, as hereinafter more fully described.

Although I have shown and described the ball type detent 136, it is to be understood that other suitable movable detent constructions may be employed within the scope of the present invention.

The inner case 110 of coupling ring 106 is rotatably mounted in a fixed axial position on the outside of plug barrel 66 in the following manner: The front edge 144 of endbell 72 operatively engages the rear edge 146 of inner case 110. A forwardly directed shoulder 148 on the inside of inner case 110 operatively engages the rearwardly directed shoulder 150 of an outwardly projecting flange 152 on plug barrel 66.

A resilient sealing ring 154 is seated in a recess 156 in the forwardly facing surface of flange 152. The sealing ring 154 operatively engages the flat, front face 52 of the female receptacle shell 20 when the plug and receptacle members are operatively connected in the manner hereinafter described, in order to provide a moisture-proof seal between the plug barrel 66 and the receptacle shell 20.

Figure 6:
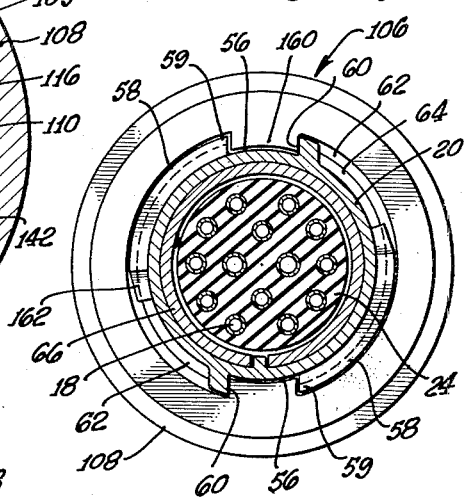
FIGURE 6 is a cross-section similar to FIGURE 3 but taken on the line 6—6 in FIGURE 4, further illustrating the relations of the parts in the initially engaged positions of the male and female connector members but before movement of the coupling ring toward the locked position.

Diametrically opposed internal coupling keys 158 are provided on inner case 110 of coupling ring 106, these internal keys 158 being initially aligned with the external axial slots 56 on receptacle shell 20 when the plug and receptacle members are initially engaged as best shown in FIGURES 4 and 6 of the drawings. Upon clockwise rotation of coupling ring 106 about plug barrel 66 as viewed in FIGURES 5, 8 and 10 (anti-clockwise as viewed in FIGURES 3 and 6), the internal coupling keys 158 on inner case 110 operatively engage the respective thread elements 54 at the front end of receptacle shell 20 to draw the flat, front face 52 of receptacle shell 20 into tight sealing engagement against the resilient sealing ring 154 seated on plug barrel 66.

Diametrically opposed, internal locking keys 160 are provided on outer case 108 of coupling ring 106, the keys 160 being axially aligned with the internal coupling keys 158 on inner case 110, and being disposed forwardly of the coupling keys 158. While the coupling keys 158 on inner case 110 provide the primary means for holding the plug member 12 and the receptacle member 14 in operative engagement and for tightening these members together, the internal keys 160 on the outer case 108 are employed for locking the coupling ring 106 in its final coupling position. Thus, when the plug member 12 is initially engaged in the receptacle member 14 as shown in FIGURES 4 and 6, the locking keys 160 and the coupling keys 158 will both slide rearwardly into external slots 56 on receptacle shell 20 until the front sealing face 52 on receptacle shell 20 comes into operative engagement with the resilient sealing ring 154 on plug barrel 66. During this engagement of the members, the plug member 12 is held in the hand by grasping the coupling ring 106, and upon seating of the front face 52 of the receptacle shell against the sealing ring 154 on the plug barrel the forward movement of the outer case 108 is continued until the locking keys 160 move far enough into the external grooves 56 on the receptacle shell to clear the peripheral barriers 58. This forward movement of outer case 108 will be independent of the plug barrel 66 and of the inner case 110, and will be against the force of spring 126, and this axial movement of outer case 108 will also move the lugs 130 out of the way of detents 136 whereby the coupling ring 106 will be free to rotate about plug barrel 66 and receptacle shell 20.

Figure 8:
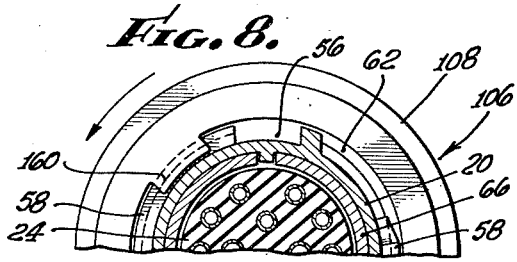
FIGURE 8 is a cross-section along the line 8—8 of FIGURE 7, with the parts in the same relative positions as in FIGURE 7.

Clockwise rotation of coupling ring 106 as viewed in FIGURES 5, 8 and 10 (anti-clockwise as viewed in FIGURES 3 and 6) will engage the coupling keys 158 against the thread elements 54, and will also move the locking keys 160 behind the peripheral barriers 58 until they reach the notches or recesses 62 in peripheral barriers 58, at which time the coupling ring 106 will have moved from the position shown in FIGURE 6 to the position shown in FIGURE 3. In this fully engaged position, the outer case 108 will be moved rearwardly over the inner case 110 by spring 126 to move the locking keys 160 into the fully locked position within the respective notches or recesses 62. The locking keys 160 will abut against webs 64 at the bottoms of notches 62, to hold the outer case 108 slightly forward of its fully returned position over inner case 110, in order to retain a certain amount of engaging force between the locking keys 160 and the webs 64. This ensures that vibration or other accidental external forces will not cause the coupling ring 106 to rotate out of this locked position and thereby accidentally release the coupling.

To uncouple the plug and receptacle members, the coupling ring 106 is rotated anti-clockwise in FIGURES 5, 8 and 10 (clockwise in FIGURES 3 and 6), which causes locking keys 160 to be cammed forward on ramps 162 and thus clear the trailing ends of peripheral barriers 58, the trailing ends 164 of keys 160 being suitably bevelled for this purpose. The outer case 108 is thus advanced by this camming action against the force of spring 126. Alternatively, the outer case 108 may be pushed forward relative to inner case 110 against the pressure of spring 126 so that the keys 160 will clear the trailing ends of peripheral barriers 58. Then the coupling ring 106 is rotated anti-clockwise in FIGURES 5, 8 and 10 (clockwise in FIGURES 3 and 6) over the plug and receptacle members, thereby releasing the pressure of the front face 52 of receptacle shell 20 against the resilient sealing ring 154. Coupling ring 106 is rotated in this direction until the coupling keys 158 and locking keys 160 enter the axial keyway slots 56 on the outer surface of receptacle shell 20. The plug member 12 may then be freely withdrawn from the receptacle member 14.

Having thus described my invention, what I claim as new and desire to secure by Letters Patent is:

1. A multi-contact electrical connector comprising a female connector member having a tubular front shell portion, and insulation body mounted in the shell and a plurality of electrical contact elements mounted in the insulation body, a male connector member comprising a barrel having a front end portion receivable axially in the front end portion of said shell, an insulation body mounted in the barrel and a plurality of electrical contact elements mounted in the insulation body of the barrel, said contact elements being interengageable when said connector members are interengaged, an annular coupling ring assembly mounted on said male connector member and extending over a portion of said female front shell portion when said male and female members are operatively interengaged, said coupling ring being rotatable about said male member between an initial position and a final locking position, said coupling ring including an annular inner case rotatably mounted in fixed axial position on said male member, a thread element on the outer surface of said female shell, an internal coupling key on said inner case and operatively engageable with said thread element by rotation of said inner case from said initial position of said coupling ring toward said final locking position of said coupling ring, an annular outer case forming a part of said coupling ring and mounted over said inner case, said outer case being keyed to said inner case for synchronous rotation of said inner and outer cases and said outer case being axially movable over said inner case between retracted and extended positions, an external locking barrier on said female shell, and an internal locking key on said outer case operatively engageable in a locking position over said barrier, said locking key being advanced forwardly to clear said barrier by advancing said outer case axially toward its extended position on said inner case during rotation of said coupling ring from its said initial position toward its said final locking position, and said locking key being moved rearwardly into locking position beyond said barrier by moving said outer case axially toward its retracted position on said inner case when said coupling ring has been moved to its said final locking position.

2. The multi-contact electrical connector of claim 1 which further includes spring biasing means operatively engageable between said outer and inner cases to urge said outer case toward its said retracted position on said inner case, whereby said outer case locking key will be held by spring force in its said locking position beyond said barrier.

3. The multi-contact electrical connector of claim 2 which further includes a resilient sealing member mounted in front of a forwardly facing shoulder on the outside of said male connector member, and a forwardly facing surface on said female connector, said sealing member being operatively engaged between said shoulder and said surface upon operative engagement of said male connector member in said female connector member, and alignment means for holding said coupling ring in its said initial position on said male connector member, said alignment means comprising a recess in the outer wall of said male connector member, a detent movably mounted on said inner case of said coupling ring and movable between an inner position operatively engaged in said recess to prevent rotation of said coupling ring about said male connector member and an outer position removed from said recess to permit rotation of said coupling ring about said male connector member toward said final locking position, and a detent depressing member attached to said coupling ring outer case, said depressing member operatively engaging said detent to hold said detent in said recess when said outer case is in its said retracted position, said depressing member being moved out of engagement with said detent upon forward movement of said case over said inner case.

4. The multi-contact electrical connector of claim 1 in which a ramp is provided at the end of said barrier adjacent to said locking key when said key is in the final locking position, whereby said locking key will be cammed forwardly on said ramp to clear said barrier upon rotation of said coupling ring toward said initial position from said final locking position in order to uncouple the connector.

5. A coupling comprising first and second engaging members having front portions that are selectively operatively interengageable, an annular coupling ring assembly mounted on said first engaging member and extending externally over a portion of said second member when said engaging members are in the engaged position, said coupling ring assembly including an annular inner case rotatably mounted in fixed axial position on said first engaging member, a thread element on the outer surface of said second engaging member, an internal coupling key on said inner case and operatively engageable with said thread element by rotation of said inner case, an annular outer case forming a part of said coupling ring assembly and mounted over said inner case, said outer case being keyed to said inner case for synchronous rotation of sadi inner and outer cases and said outer case being axially movable over said inner case between retracted and extended positions, an external locking barrier on said second engaging member, an internal locking key on said outer case operatively engageable in a locking position over said barrier, said locking key being advanced forwardly to clear said barrier and being moved rearwardly into locking position beyond said barrier by advancing said outer case axially toward its extended position while said coupling ring is rotated to engage said coupling key with said thread element and then moving said outer case back toward its retracted position when said inner case key is fully engaged with said thread element, operatively engaging polarizing means on said first and second engaging members to hold said engaging members in fixed relative angular relationship upon operative interengagement thereof, and alignment means for holding said coupling ring in fixed initial angular positioning on said first engaging member for proper initial alignment of the coupling key with said thread element and said locking key with said barrier, said alignment means comprising a recess in the outer wall of said first engaging member, a detent movably mounted on said inner case of said coupling ring and moveable between an inner position operatively engaged in said recess to prevent rotation of said coupling ring about said first engaging member and an outer position removed from the recess to permit rotation of said coupling ring about said first engaging member, and a detent depressing member attached to said coupling ring outer case, said depressing member operatively engaging said detent to hold said detent in said recess when said outer case is in its said retracted position, and said depressing member being moved out of engagement with said detent upon forward movement of said outer case over said inner case.

6. The coupling of claim 5 in which a second recess is provided in the outer wall of said first engaging member in circumferentially spaced relation to said first mentioned recess to receive said detent when said coupling ring has been rotated to its said locking position.

7. A coupling comprising a female member having tubular front shell portion, a male member having a front end barrel portion receivable axially within said female shell portion, an annular coupling ring assembly mounted on said male member and extending externally over a portion of said female shell portion when said male member is operatively engaged within said female shell portion, said coupling including an annular inner case rotatably mounted in fixed axial position on said male member, a thread element on the outer surface of said female shell portion, an internal coupling key on said inner case and operatively engageable with said thread element by rotation of said inner case, an annular outer case forming a part of said coupling ring and mounted over said inner case, said outer case being keyed to said inner case for synchronous rotation of said inner and outer cases and said outer case being axially movable over said inner case between retracted and extended positions, an external locking barrier on said female shell portion, an internal locking key on said outer case operatively engageable in a locking position over said barrier, said locking key being advanced forwardly to clear said barrier and being moved rearwardly into locking position beyond said barrier by advancing said outer case axially toward its extended position on said inner case while said coupling ring is rotated to engage said coupling key with said thread element and then moving said outer case back toward its retracted position when said inner case key is fully engaged with said thread element, operatively engaging polarizing means on said male and female members to hold said members in fixed relative angular relationship upon operative engagement of said male member in said female member, and alignment means for holding said coupling ring in fixed angular positioning on said male member for proper initial alignment of said coupling key with said thread element and said locking key with said barrier, said alignment means comprising a recess in the outer wall of said male member, a detent movably mounted on said inner case of said coupling ring and movable between an inner position operatively engaged in said recess to prevent rotation of said coupling ring about said male member and an outer position removed from said recess to permit rotation of said coupling ring about said male member, and a detent depressing member attached to said coupling ring outer case, said depressing member operatively engaging said detent to hold said detent in said recess when said outer case is in its retracted position, and said depressing member being moved out of engagement with the detent upon forward movement of said outer case over said inner case.

References Cited in the file of this patent
UNITED STATES PATENTS

| | | |
|---|---|---|
| 2,400,351 | Hart | May 14, 1946 |
| 2,561,677 | Souriau | July 24, 1951 |
| 2,656,203 | Musser | Oct. 20, 1953 |